United States Patent Office 2,783,246
Patented Feb. 26, 1957

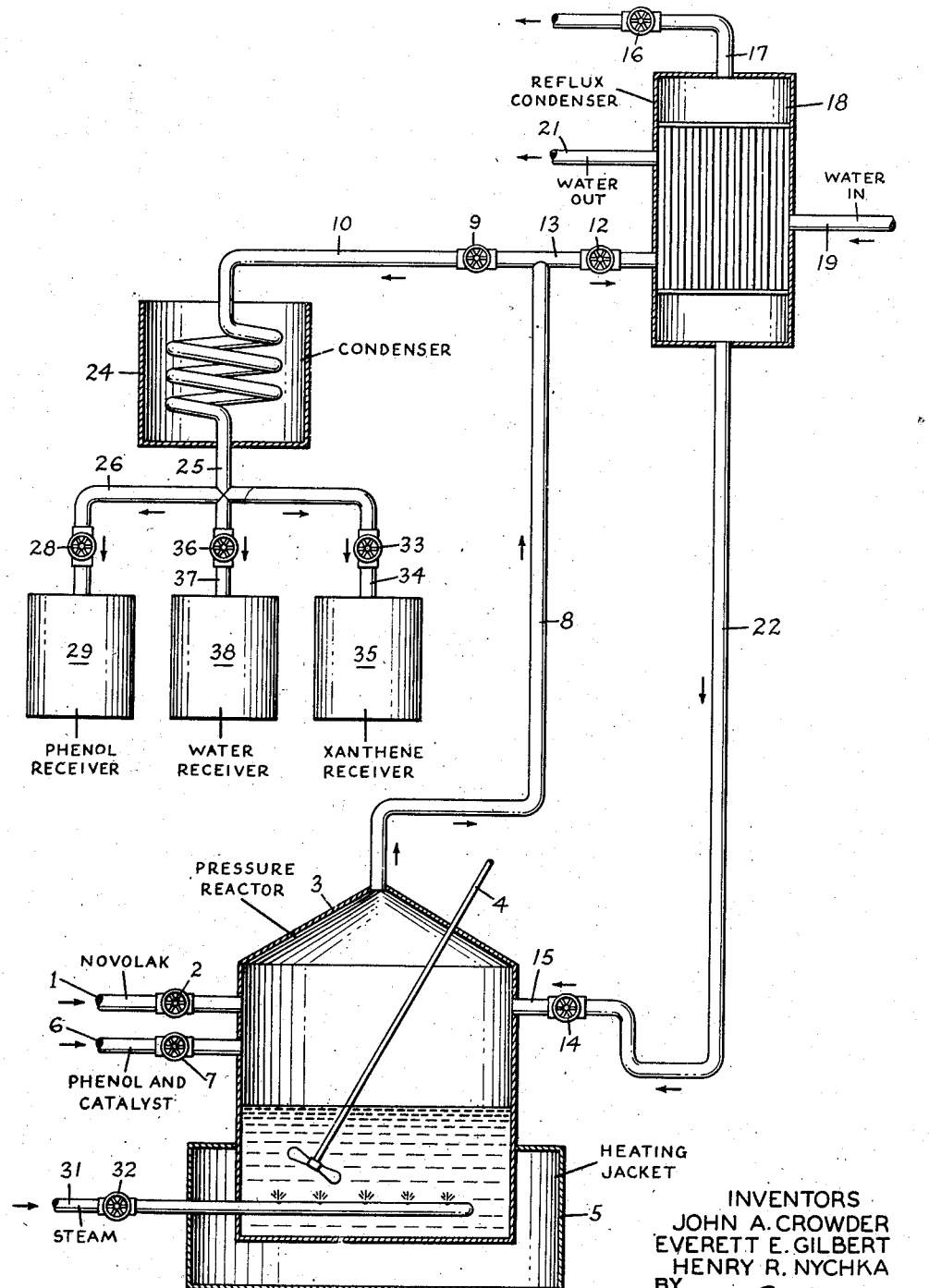

2,783,246

MANUFACTURE OF XANTHENE

John A. Crowder, Everett E. Gilbert, and Henry R. Nychka, Morristown, N. J., assignors to Allied Chemical & Dye Corporation, New York, N. Y., a corporation of New York Application May 2, 1955, Serial No. 505,442

9 Claims. (Cl. 260—335)

This invention relates to a novel process for the manufacture of xanthene (diphenylenemethane oxide). Xanthene is an intermediate in the preparation and manufacture of certain pharmaceuticals and is also used in the formulation of perfumes. The yellowish crystalline xanthene leaflets are soluble in ether and melt at 100.5° C. Xanthene can be prepared by the condensation of ortho cresol and phenol in the presence of aluminum chloride, but the yield from such a condensation is not commercially attractive. At present, xanthene is produced commercially by the reduction of xanthone (dibenzo-γ-pyrone) which can be accomplished by distilling xanthone with zinc dust, or, alternatively, by direct hydrogenation. Xanthone, in turn, can be prepared by heating salicylic acid with either phosphorus oxychloride or acetic anhydride. Because of the nature of the processes involved and the cost of the raw materials required in the above methods of manufacture, xanthene now sells for about four dollars per pound, which price has restricted the use of xanthene.

An object of the present invention is to provide an efficient process for the manufacture of pure xanthene from relatively inexpensive raw materials.

A further object is to provide a new and improved process for the production of increased yields of xanthene.

Other objects and advantages will be apparent from the following description and accompanying drawing.

In accordance with the present invention high yields of pure xanthene may be prepared in a simple and expeditious manner from relatively inexpensive raw materials by heating an intermediate phenol-formaldehyde condensation product in the presence of a $P_2O_5$ catalyst at a temperature above about 200° C. for a sufficient length of time to convert the intermediate phenol-formaldehyde condensation product into high yields of xanthene.

In a specific embodiment of the present invention, a mixture of novolak and a substantial amount of free phenol and phosphoric acid or phosphorus pentoxide in an amount between 3 to about 20 or more percent by weight of the novolak, preferably about 5–15% of the novolak is heated to a temperature above 100° C., preferably within the range of 125–175° C., and under substantially atmospheric pressure, water vapor evolved during the heating is released, heating of the mixture is continued under superatmospheric pressure, desirably in excess of 50 p. s. i. g., preferably between 75–125 p. s. i. g., at a temperature above about 200° C., preferably within the range of about 250–350° C. and the mixture is maintained at this higher temperature for a sufficient length of time to effect conversion of the novolak and phenol into xanthene, the reaction mixture is cooled to within the range of about 150–200° C., unreacted phenol is distilled off and recovered, and then the residue is distilled, preferably with the aid of superheated steam at substantially atmospheric pressure and temperature of 150–175° C. to vaporize xanthene, and the xanthene is condensed and collected.

Novolaks are readily available well known commercial products, relatively low in cost, produced by reacting phenol with less than a molal proportion of formaldehyde, about 6 mols of phenol to 5 mols of formaldehyde, in the presence of an acid catalyst to produce a fusible resin which will not harden upon heating to an insoluble infusible condition but will remain soluble and fusible. A typical novolak may be prepared as follows: phenol and formalin (37% $CH_2O$ in water) in about 6:5 molal ratio together with a small amount of sulfuric acid catalyst in an amount of 2% by weight of the mixture are passed through a series of tubular coils externally heated by superheated steam in a surrounding steam jacket wherein condensation of the phenol formaldehyde is effected by heating the coil contents to a temperature of 95–105° C. for a period of 20–30 minutes. Effluent from the resinification coil discharges into a separator tank wherein it separates into a lower resin layer and an upper aqueous layer, which latter may be discharged from the system to the sewer. The resin layer from the separator tank is sent through a jacketed pipe dehydrator coil wherein the resin is rapidly heated to a temperature of 150–170° C. and the vapors and liquid from the dehydrator coil transferred to a vapor separator wherein water vapors are released and the liquid dehydrated resin (novolak) in molten condition is discharged from the bottom of the vapor separator. Apparatus and method of operation for the production of novolaks are more fully illustrated in U. S. Patent 2,658,054, issued November 3, 1953.

While we do not wish to predicate our process on any particular theory or mechanism of reaction the following explanation may aid in a better understanding of the present invention. Novolaks are a mixture of various condensation products of phenol and formaldehyde which may be said to be intermediate condensation products in the sense that they are not in an infusible insoluble condition. More specifically, novolaks contain methylol phenols and dihydroxydiphenyl methanes as well as other incompletely converted condensation products. Theoretically the potential yield of xanthene from novolak is relatively small due to the small percentage, generally less than about 30% of 2,2'-dihydroxydiphenyl methane. Yields of 80–90% of xanthene would be impossible since normally only the 2,2'-dihydroxydiphenyl methane would be expected to yield xanthene and the other dihydroxydiphenyl methanes will not normally be converted to xanthene but will, upon heating, polymerize to form red gummy resins which inhibit production of xanthene and make the separation of such xanthene as is formed difficult if not practically impossible. In the process of the present invention rearrangement of the molecule, isomerization, and reaction of compounds in the novolak into 2,2'-dihydroxydiphenyl methane with consequent increased yields of desired xanthene, decreased by-product formation and production of purer xanthene occurs as illustrated below.

Methylol phenol reacts with phenol to form 2,2'-dihydroxydiphenyl methane as follows:

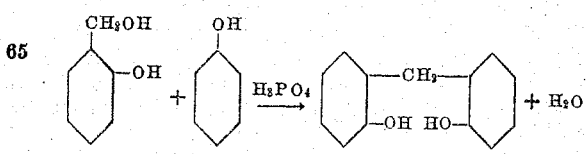

A further reaction involves the dehydration of the 2,2'-dihydroxydiphenyl methane in the presence of phosphoric acid or phosphorus pentoxide to yield xanthane as follows:

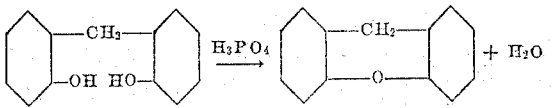

The isomerization of the compounds in the novolak to the 2,2'-isomer may be illustrated by the following equation:

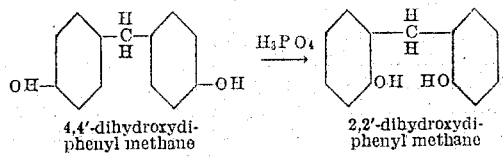

4,4'-dihydroxydi-phenyl methane      2,2'-dihydroxydi-phenyl methane

The profound effect of these reactions is demonstrated by our obtaining yields as high as 80 or more percent of pure xanthene based on the weight of novolak charged to the system.

The accompanying drawing is a diagrammatic representation of apparatus employed in one method of practicing the present invention. Referring to the drawing novolak is admitted through line 1 and valve 2 into pressure reactor 3 comprising a vessel constructed to withstand superatmospheric pressure of the order of 100–200 p. s. i., equipped with stirrer 4 and provided with heating jacket 5 through which may be passed any suitable heating medium such as super-heated steam to heat the contents in chamber 3. Although methylol phenols from any source or dihydroxydiphenyl methanes may be employed as the charge to chamber 3, generally it will be found more convenient and cheaper to employ a readily available commercial novolak containing a mixture of intermediate phenol formaldehyde condensation products. Free phenol is introduced into chamber 3 through line 6 and valve 7. The use of free phenol is necessary when employing novolaks containing methylol phenols as a constituent thereof in order to obtain high yields of xanthene. The addition of free phenol is not necessary but desirable when processing dihydroxydiphenyl methanes in that the phenol acts as a solvent and diluent for the reaction mixture. The quantity of phenol is preferably in large excess. In practice an amount of phenol of about twice or three times the amount of novolak has been found satisfactory.

Catalyst in an amount of from 3% to in excess of 20% by weight of the novolak may also be introduced into the mixture through line 6 and valve 7. The catalyst may be phosphoric acid or phosphorus pentoxide which is the anhydride of phosphoric acid, or a phosphoric complex resulting from the reaction of phosphoric acid or phosphorus pentoxide with an organic material, e. g. a reaction product of phenol with phosphorus pentoxide or esters of phosphoric acid. The term "$P_2O_5$" catalyst is intended to include phosphoric acid which is hydrated phosphorus pentoxide, phosphorus pentoxide not combined with water and $P_2O_5$ complexes, i. e. with or without water loosely combined with another material. Commercial 85% phosphoric acid is our preferred catalyst; it is cheaper and easier to handle than $P_2O_5$; also it is possible to attain rapid solution of this acid. The 85% phosphoric acid catalyst should desirably be dissolved in a reaction mixture in the shortest possible time. This can be accomplished by agitation with stirrer 4 and by heating the mixture rapidly to about 160–170° C. under substantially atmospheric pressure while permitting evolved water to escape from the top of chamber 3 through line 8, valve 9 and line 10, and to condense in condenser 24 and the condensate is passed down through line 25, valve 36, line 37 into water receiver 38. In this manner solution of the catalyst may be effected in 15–30 minutes. If all of the catalyst is not dissolved two adverse effects have been noticed. The yield of xanthene is lower and the yield of by-products is increased. The by-products are resinous in nature and complicate the isolation of the xanthene from the reaction mixture. After removal of water, valve 9 in line 10 is closed and valve 12 in vapor line 13, valve 14 in reflux line 15 and valve 16 in pressure release line 17 are closed and the mixture heated above about 200° C. under autogenous pressure of above about 50 p. s. i. gage. Vapors generated by heating the reaction mixture in vessel 3 pass upwardly through vapor lines 8 and 13 into reflux condenser 18 wherein they are condensed by indirect contact with cooling water entering through line 19 and discharging through line 21 and liquid condensate is returned through reflux lines 22 and 15 to pressure reactor 3. Pressure on the system may be maintained by regulating valve 16 in line 17. During the reaction the liquid contents of chamber 3 are constantly agitated by means of stirrer 4. In order to obtain effective conversion of the novolak to xanthene it is necessary to maintain the reaction mixture at a temperature in excess of about 200° C., preferably within the range of about 250–350° C. Although the reaction may be carried out under substantially atmospheric pressure conditions the yields and rate of reaction are appreciably increased when the conversion is conducted at superatmospheric pressure in excess of about 50 p. s. i. gage, preferably within the range of about 75–125 p. s. i. gage. Heating of the reaction mixture in chamber 3 under reflux is continued until the novolak is converted into high yields of xanthene. Merely by way of illustration an 80% yield of xanthene was produced by heating novolak at a temperature of 300° C. and a pressure of 100 p. s. i. for a period of 7 hours. The time required will vary somewhat depending upon the temperature and pressure under which the reaction is carried out. At lower temperature and pressure the time is longer and at higher temperature and pressure the time of the reaction is shorter.

After completion of the reaction the mixture is cooled down to a temperature of about 180° C. Valve 9 is opened to release pressure and reduce it to substantially atmospheric pressure and heat is applied to pressure reactor 3 to distill out unreacted phenol from the reaction mixture. The temperature is slowly raised to 250° C. at which point about 95% of the residual phenol in the reaction mixture is distilled out passing up through line 8, valve 9, line 10 into condenser 24 thence through lines 25 and 26, valve 28 and into receiver 29. The phenol collected in receiver 29 may be recycled to chamber 3 via line 6 and valve 7 for further reaction with novolak into additional xanthene. Steam is then introduced through line 31 and valve 32 at the bottom of vessel 3 to distill out the xanthene. The temperature of the organic residue in chamber 3 is maintained at about 150–160° C. during this step. Steam and xanthene vapors pass up through line 8, valve 9, line 10, condenser 24, line 25, valve 33 and line 34, into xanthene receiver 35. Xanthene is not water-soluble and does not retain moisture easily. The xanthene may be separated from the water distillate collecting in receiver 35 by conventional filtering. The filter cake may be dried by any convenient procedure such as in trays at room temperature or slightly above. The xanthene product is of high purity and can be sold for most purposes with no further treatment.

Isolation of xanthene from the reaction mixture may also be carried out by dissolving the reaction mixture in ether and extracting with a 10–25% sodium hydroxide solution. This procedure has utility for small scale operation. However, the product obtained by alkaline extraction is not as pure as xanthene recovered by steam distillation. The steam distilled xanthene product is white to very pale yellow in color, and generally has a melting point in the range of 98–101° C.

An advantage that our process entails is the relative cheapness of the raw materials. This factor, combined with the high yield and the simplicity of the operation, makes the process very attractive economically. Another advantage lies in the nature of the raw materials and the compounds involved, all of which are for the most part relatively non-corrosive under conditions of operation.

In order that those skilled in the art may better understand how the present invention may be practiced, the following examples are given by way of illustration. All parts are by weight.

*Example 1*

2.368 parts of phenol were added to a pressure vessel, and 1.184 parts of a novolak prepared from the condensation of 6 mols of phenol and 5 mols of formaldehyde were added to the pressure vessel. The mixture was warmed and stirred until the novolak was dissolved in the phenol. Then .21 part of 85% phosphoric acid was added, and the mixture was stirred and heated rapidly to 185–190° C., while steam was allowed to escape from the vessel. As soon as the phosphoric acid was completely dissolved, the outlet to the pressure vessel was closed, and the temperature of the mixture brought to 300° C. and held there for seven hours while the mixture was slowly stirred. Then the mixture was cooled to 185° C. and opened to a condenser until the 1.738 parts of recycle phenol had been distilled off and recovered. The residue was stripped with superheated steam at 150 to 160° C. to effect separation of xanthene which appeared as a slurry in the condenser from which 1.00 part of pure xanthene crystals were filtered. The yield was 84.4% of the original novolak.

*Example 2*

25 parts of novolak were dissolved in 50 parts of phenol, and stirred. Then, 16.7 parts of phosphorus pentoxide were added to the mixture, which was heated rapidly to 185° C. while steam was allowed to escape. After one minute, the outlet of the pressure vessel was closed, and the temperature of the mixture raised to 300° C. and held there for seven hours while the mixture was slowly stirred. Then the mixture was cooled to 185° C., the outlet opened, and the phenol permitted to distill off. The residue was dissolved in ether and the xanthene extracted with 10–25% aqueous sodium hydroxide solution. The yield was 20.3 parts, or 81.3% of the original novolak.

*Example 3*

The intermediate compound 2,2'-dihydroxydiphenyl methane was used as starting material, and the xanthene was produced in an open vessel. Three parts of 99% pure 2,2'-dihydroxydiphenyl methane were mixed with 6 parts of phenol and 0.69 part of 85% phosphoric acid and then heated in an open container at 200° C. for 144 hours. Upon separation by distillation, it was found that 90.2% of the 2,2'-dihydroxydiphenyl methane had been converted to xanthene.

Although certain embodiments of the invention have been disclosed for purposes of illustration, it will be evident that various changes and modifications may be made therein without departing from the scope and spirit of the invention.

We claim:

1. A process for the manufacture of xanthene which comprises heating a condensation product selected from the group consisting of a novolak which is a condensation product of phenol and formaldehyde, dihydroxydiphenyl methane and methylol phenol in the presence of free phenol and in the presence of a $P_2O_5$ catalyst selected from the group consisting of $P_2O_5$, hydrated $P_2O_5$ and reaction product of phenol with phosphorus pentoxide between a temperature above about 200° C. and below the decomposing temperature of xanthene for a sufficient length of time to convert said condensation product into xanthene.

2. A process for the manufacture of xanthene which comprises heating a mixture of novolak resulting from the condensation of phenol and formaldehyde and free phenol in the presence of a $P_2O_5$ catalyst selected from the group consisting of $P_2O_5$, hydrated $P_2O_5$ and reaction product of phenol with phosphorus pentoxide between a temperature above about 200° C. and below the decomposing temperature of xanthene for a sufficient length of time to convert the novolak into high yields of xanthene.

3. A process for the manufacture of xanthene which comprises heating a mixture of methylol phenol and free phenol in the presence of a $P_2O_5$ catalyst selected from the group consisting of $P_2O_5$, hydrated $P_2O_5$ and reaction product of phenol with phosphorus pentoxide between a temperature above about 200° C. and below the decomposing temperature of xanthene for a sufficient length of time to convert the methylol phenol into high yields of xanthene.

4. A process for the manufacture of xanthene which comprises heating dihydroxydiphenyl methane in the presence of a $P_2O_5$ catalyst selected from the group consisting of $P_2O_5$, hydrated $P_2O_5$ and reaction product of phenol with phosphorus pentoxide between a temperature above about 200° C. and below the decomposing temperature of xanthene for a sufficient length of time to convert the dihydroxydiphenyl methane into high yields of xanthene.

5. A process for the manufacture of xanthene which comprises heating a mixture of novolak resulting from the condensation of phenol and formaldehyde, free phenol and phosphoric acid in an amount between 3 to about 20% by weight of the novolak under superatmospheric pressure in excess of about 50 p. s. i. g. to a temperature above about 200° C. and below the decomposing temperature of xanthene for a sufficient length of time to convert the novolak into high yields of xanthene.

6. A process for the manufacture of xanthene which comprises heating a mixture of novolak resulting from the condensation of phenol and formaldehyde, free phenol and phosphorus pentoxide in amount between 3 to about 20% by weight of the novolak under superatmospheric pressure in excess of about 50 p. s. i. g. to a temperature above about 200° C. and below the decomposing temperature of xanthene for a sufficient length of time to convert the novolak into high yields of xanthene.

7. A process for the manufacture of xanthene which comprises heating a mixture of novolak resulting from the condensation of phenol and formaldehyde and an excess amount of free phenol and phosphoric acid in an amount between about 5–15% by weight of the novolak to a temperature between 100° C. and 175° C. and removing water evolved from the mixture during heating, continuing heating the mixture under superatmospheric pressure in excess of about 50 p. s. i. g. to a temperature within the range of about 250–350° C., maintaining the mixture at this higher temperature for a sufficient length of time to effect conversion of the novolak into xanthene, cooling the reaction mixture to a temperature between 150–200° C., distilling unreacted phenol from the reaction mixture, distilling the reaction mixture residue with the aid of superheated steam to vaporize xanthene and recovering the vaporized xanthene.

8. A process for the manufacture of xanthene which comprises heating a mixture of methylol phenol and an excess amount of free phenol and phosphoric acid in an amount between about 5–15% by weight of the methylol phenol to a temperature between 100° C. and 175° C. and removing water evolved from the mixture during heating, continuing heating the mixture under superatmospheric pressure in excess of about 50 p. s. i. g. to a temperature within the range of about 250–350° C., maintaining the mixture at this higher temperature for a sufficient length of time to effect conversion of the methylol phenol into xanthene, cooling the reaction mixture to a temperature between 150–200° C., distilling unreacted phenol from the reaction mixture, distilling the reaction mixture residue with the aid of superheated steam to vaporize xanthene and recovering the vaporized xanthene.

9. A process for the manufacture of xanthene which comprises heating a mixture of dihydroxydiphenyl methane and excess free phenol and phosphoric acid in an amount between about 5–15% by weight of the dihydroxydiphenyl methane to a temperature between 100° C. and 175° C. and removing water evolved from the mixture during heating, continuing heating the mixture under superatmospheric pressure in excess of about 50 p. s. i. g. to a temperature within the range of about 250–350° C., maintaining the mixture at this higher temperature for a sufficient length of time to effect conversion of the dihydroxydiphenyl methane into xanthene, cooling the reaction mixture to a temperature between 150–200° C., distilling unreacted phenol from the reaction mixture, distilling the reaction mixture residue with the aid of superheated steam to vaporize xanthene and recovering the vaporized xanthene.

References Cited in the file of this patent

UNITED STATES PATENTS

| | | |
|---|---|---|
| 2,715,114 | Huck | Aug. 9, 1955 |
| 2,744,882 | Bender | May 8, 1956 |

FOREIGN PATENTS

| | | |
|---|---|---|
| 537,367 | Germany | Nov. 2, 1931 |
| 678,623 | Germany | July 20, 1939 |
| 824,390 | Germany | Dec. 10, 1951 |

OTHER REFERENCES

Vansheidt et al.: Chem. Abst., vol. 28, p. 6578 (1934).